Figure 1:
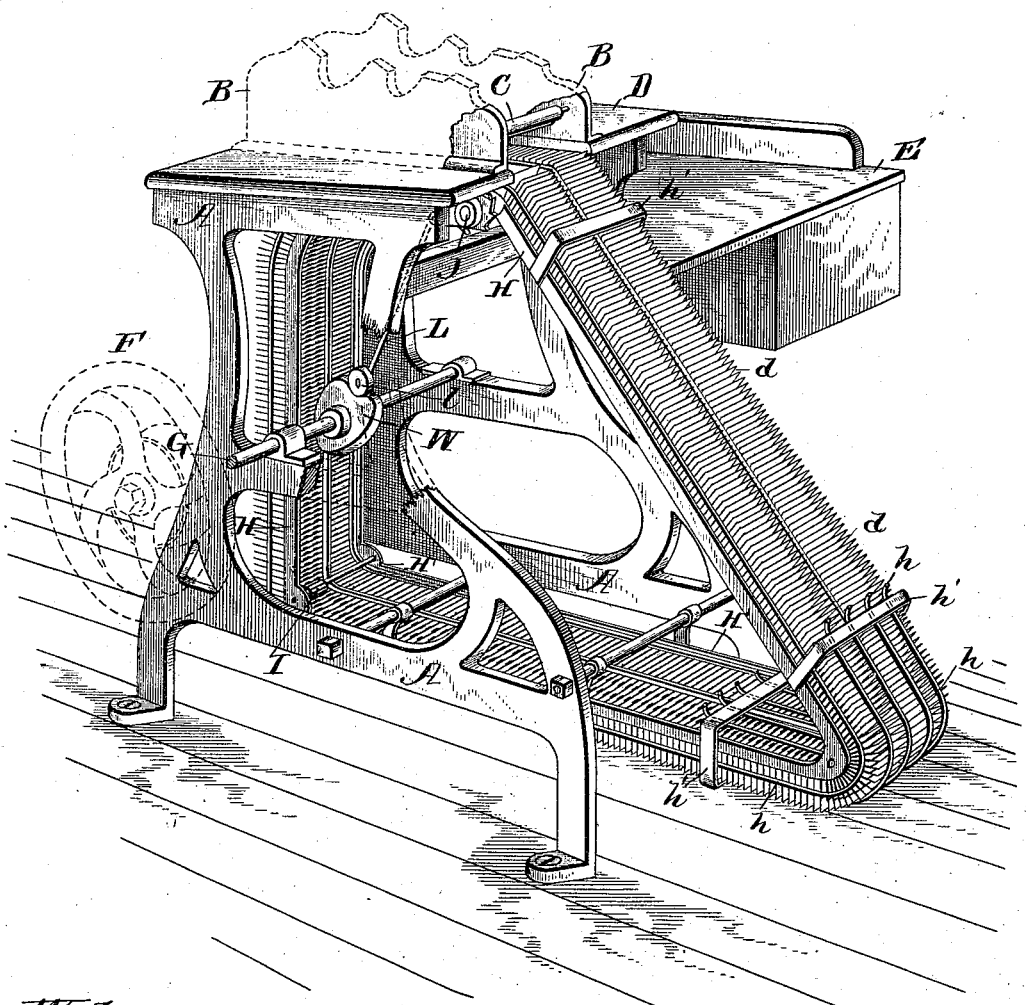

(No Model.) 4 Sheets—Sheet 1.
H. B. COOLEY, J. M. NOBLE & J. E. TREVOR.
DRYING CHAIN FOR ENVELOPE MACHINES.

No. 541,655. Patented June 25, 1895.

Witnesses:
J. B. McGinn.
A. R. Appleman Jr.

Inventors.
H. B. Cooley
J. M. Noble
J. E. Trevor
By Howson & Howson
their Atty (No Model.)  4 Sheets—Sheet 2.

H. B. COOLEY, J. M. NOBLE & J. E. TREVOR.
DRYING CHAIN FOR ENVELOPE MACHINES.

No. 541,655. Patented June 25, 1895.

Fig. 1ª.

Witnesses:
J. B. McGiver.
A. R. Appleman Jr.

Inventors:
H. B. Cooley
J. M. Noble
J. E. Trevor
By Howson & Howson
their attys.

(No Model.) 4 Sheets—Sheet 3.
H. B. COOLEY, J. M. NOBLE & J. E. TREVOR.
DRYING CHAIN FOR ENVELOPE MACHINES.

No. 541,655. Patented June 25, 1895.

Witnesses:
J. B. McGiver.
A. R. Appleman Jr.

Inventors,
H. B. Cooley,
J. M. Noble,
J. E. Trevor,
by Howson & Howson
their attys.

(No Model.) 4 Sheets—Sheet 4.

H. B. COOLEY, J. M. NOBLE & J. E. TREVOR.
DRYING CHAIN FOR ENVELOPE MACHINES.

No. 541,655. Patented June 25, 1895.

Witnesses:
J. B. McGirr.
A. R. Appleman Jr.

Inventors.
H. B. Cooley
J. M. Noble
J. E. Trevor
By Howson & Howson
their Attys.

UNITED STATES PATENT OFFICE.

HENRY BUCKLEY COOLEY, JOHN MADISON NOBLE, AND JAMES EDWARD TREVOR, OF HARTFORD, CONNECTICUT.

DRYING-CHAIN FOR ENVELOPE-MACHINES.

SPECIFICATION forming part of Letters Patent No. 541,655, dated June 25, 1895.

Application filed December 29, 1894. Serial No. 533,347. (No model.)

*To all whom it may concern:*

Be it known that we, HENRY BUCKLEY COOLEY and JOHN MADISON NOBLE, citizens of the United States, and JAMES EDWARD TREVOR, a subject of the Queen of Great Britain, residing at Hartford, Hartford county, Connecticut, have invented certain new and useful Improvements in Drying-Chains for Envelope-Machines, of which the following is a specification.

Our invention relates to drying chains for envelope machines.

The objects of our invention are, first, to provide a device of this character which will occupy as little space as possible; second, to provide means whereby the envelopes may be thoroughly dried before their discharge from the machine, without the use of any of the heating appliances commonly employed; third, to provide a chain in which two or more envelopes may be carried side by side in order that a shorter chain may be used and so that the envelopes may be discharged through the bottom of the chain; fourth, to provide means whereby the envelopes may be shifted from one side of the chain to the other after they have traveled nearly one or more circuits of the same so that they will be carried substantially nearly two or more times around with the chain before they are discharged therefrom; fifth, to provide a chain which will deliver the envelopes through the bottom thereof, instead of at the side and end, as is now customary in all the machines of which we are aware; and, lastly, to improve the general construction of the chain and mechanism for operating the same.

With these objects in view, our invention may be said to consist essentially in a drying chain capable of carrying two or more rows of envelopes side by side and in the means and mechanism for causing the envelopes to be shifted successively from one side of the chain to the other; and in means whereby the envelopes may be successively discharged through the bottom of the chain after they have been carried around with the chain two or more times.

Our invention further consists in the details of construction for effecting the general purposes above defined.

Figure 9:
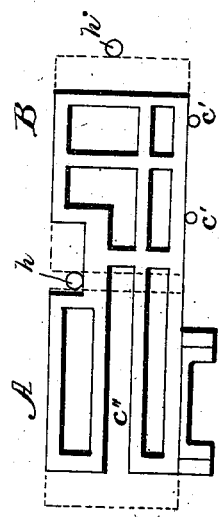
Figure 10:
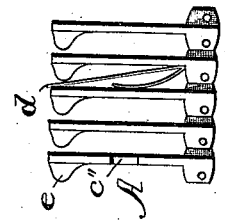
Figure 11:
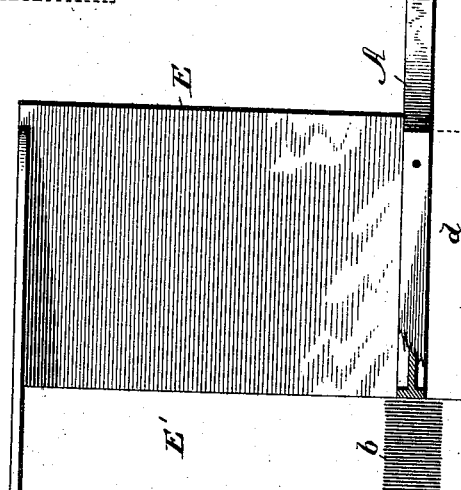
Figure 11:
Figure 11:
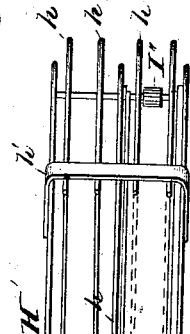
Figure 11:
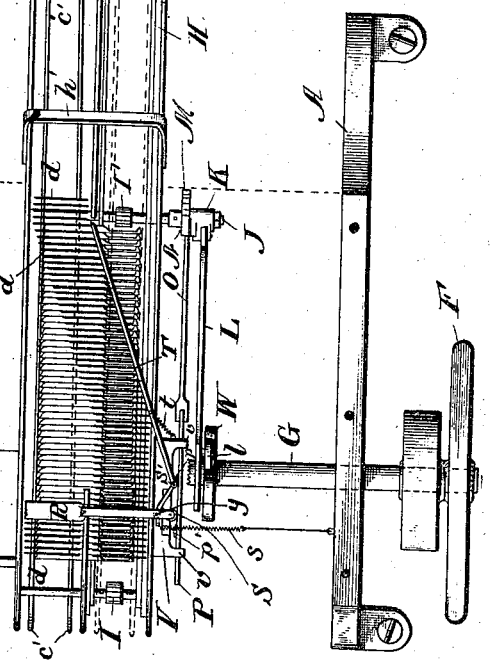
Figure 11:
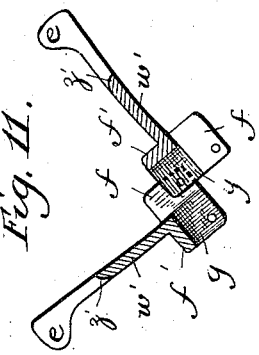
Figure 2:
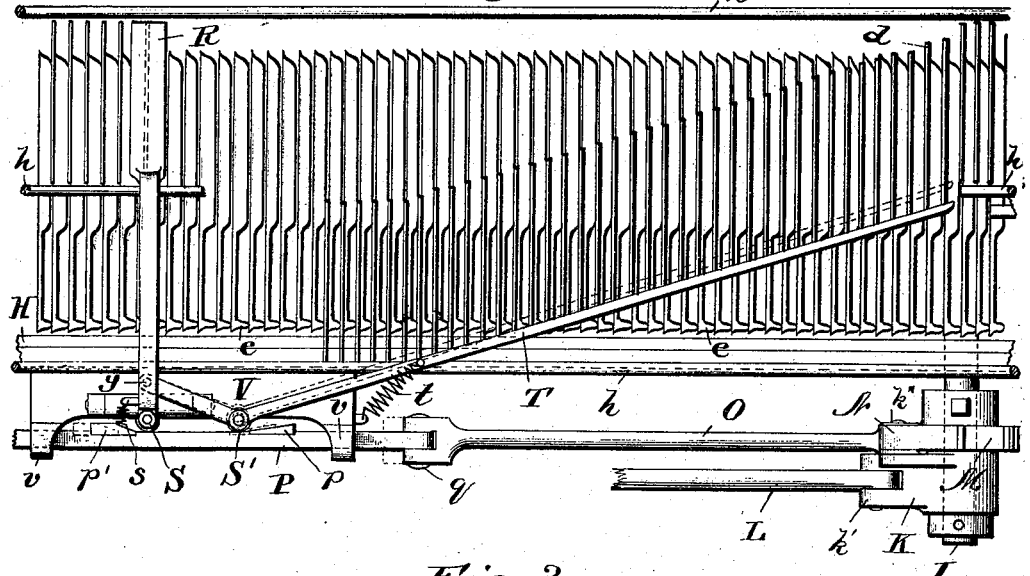
Figure 3:
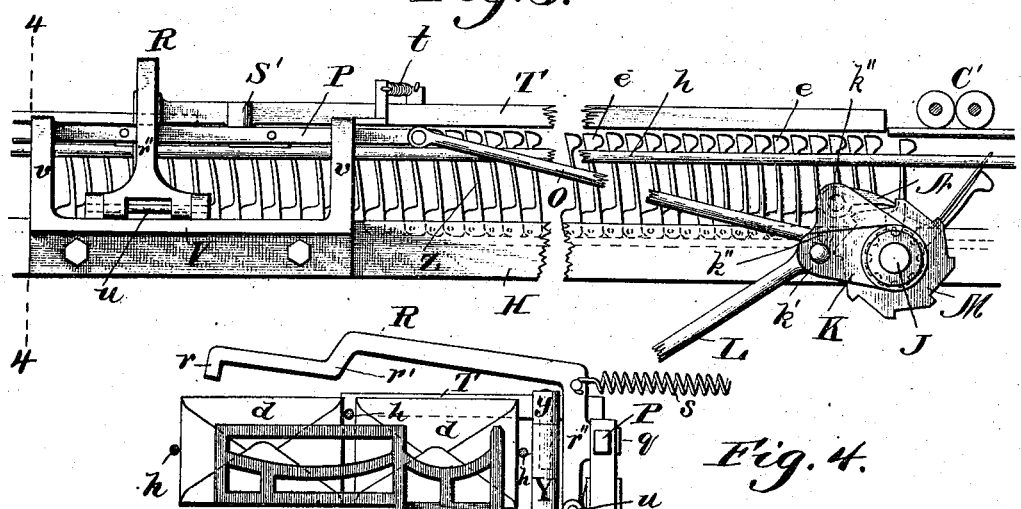
Figure 4:
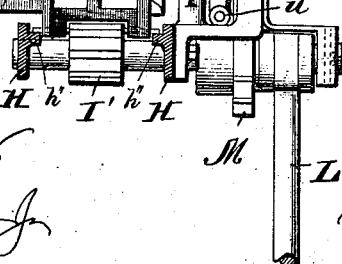
Figure 5:
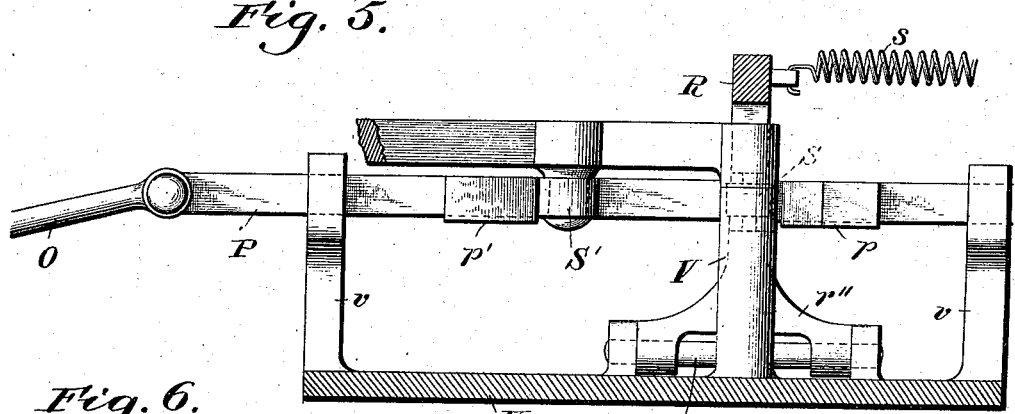
Figure 6:
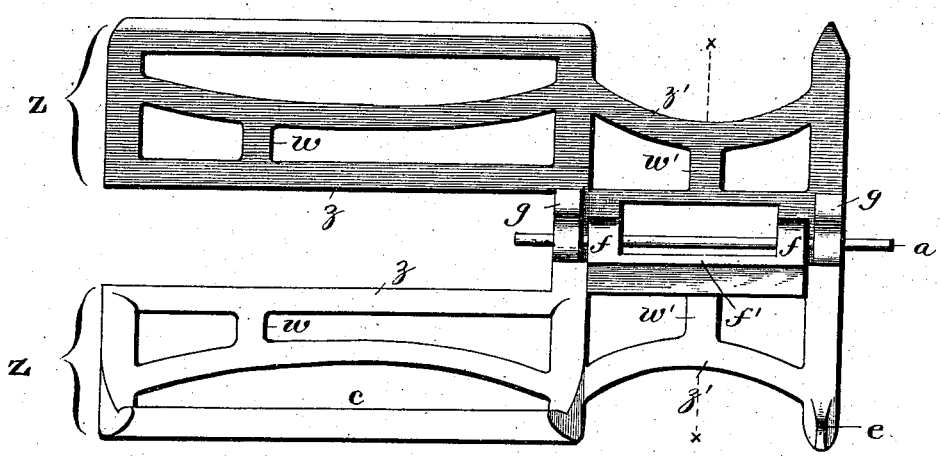
Figure 7:
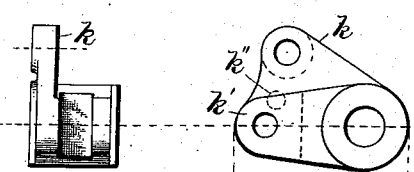
Figure 8:
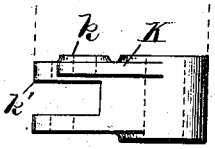

In the drawings, Figure 1 is a perspective view of so much of an envelope-machine as is necessary to show the application of our chain thereto. Fig. 1ª is a plan view of the same with the top removed. Fig. 2 is an enlarged plan view of the shifting and discharging mechanism. Fig. 3 is a side elevation thereof. Fig. 4 is a sectional end elevation on the line 4 4, Fig. 3. Fig. 5 is an enlarged sectional elevation in detail. Fig. 6 is a top plan view of two of the links of the chain. Figs. 7 and 10 are details. Fig. 8 is a bottom view of a portion of two links, illustrating the hinged joint. Fig. 9 is a modification of the link. Fig. 11 is a vertical cross-section on the line $x\ x$, Fig. 6.

Referring now particularly to the drawings in which the same letters refer to corresponding parts throughout the different views, A, is a frame of the envelope machine, such for example as that disclosed and claimed in our pending application, Serial No. 516,277, filed July 2, 1894.

D, is the top table upon which the side frames, B, of the envelope machine are supported.

E and E', represent the side table of the machine upon which the envelopes are finally delivered.

C and C', indicate the delivering rolls of the envelope machine. These latter rolls with the frames, B, are the only portion of the machine deemed necessary to show, since from these rolls the envelope, after it is folded and gummed by the machine, is discharged downward into the chain, with which latter mechanism our present invention particularly relates.

Suitably secured to the top and sides of the frame of the machine are guide frames, H and H', between which the links of the chain are confined and travel. Above these guide frames and confined by bands, $h'$, passing from one guide frame, H, around to the opposite guide frame, H', is a series of guide wires, $h$. These guide wires may be of any convenient number, and at the points where the chain alters its direction of travel, extra guide wires should be used above and below to keep the envelopes from being thrown out of the chain, as shown clearly in Fig. 1.

The guide frames, H, upon one side of the structure are provided at the points where the chain alters its direction with sprocket wheels, or spur gears, I, I', I², &c., around which sprockets one side of the links composing the chain is caused to move.

Journaled below the table, and under the delivery rolls of the machine, is a shaft, J, which is given an intermittent motion of rotation, in the manner hereinafter described, for causing the chain to move step by step, thus allowing it to dwell sufficiently long under the delivery rolls to permit the envelope to drop with certainty between two links of the chain. Upon this shaft, the driving sprocket, I', is secured, from which sprocket the chain derives its motion by the teeth of the said sprocket meshing with the pintles, $a$, Fig. 6, of the joint of two links of the chain. The projecting ends of these pintles, or rods, slide upon slideways, $h''$, formed on the two guide frames H. It may be observed at this point that there are no slideways, or sprocket wheels, upon the other side of the chain structure, which side may be designated as the "delivery" side while the other side may be properly called the "receiving" side, by which terms we will so designate them throughout this specification.

With this general description of the chain and guides, which will be set forth more in detail hereinafter, we can now better describe the mechanism for giving motion to the chain and for receiving the envelopes, and the means for passing them from the receiving side of the chain to the delivery side, and for finally discharging or delivering the said envelopes through the bottom side of the chain.

Referring then more particularly to Figs. 1 to 5, inclusive, J, is a shaft which is journaled in suitable bearings on the frame work of the machine under the delivery rolls, C, or C'. Upon this shaft is loosely mounted a casting, K, which is provided with projecting lugs, $k, k'$. Fixed to this shaft, J, between the casting, K, and the frame work of the chain structure, is a ratchet wheel, M, whose teeth are adapted to be engaged by pawl, N, carried by the lug, $k$, on the casting, K. Connected to the casting, K, between the lugs, $k'$, is a pitman, L, provided with a friction roller, $l$, held in contact with a suitable heart-shaped cam, or other cam, W, on the driving shaft, G, of the machine. The continuous rotation of this driving shaft, G, which carries a suitable fly wheel, F, imparts through the cam, W, an intermittent reciprocating motion to the pitman, L, which in turn will rock the casting, K, upon the shaft, J, thus causing the pawl, N, to move the ratchet wheel, M, one tooth at a time thereby advancing the chain one tooth of the sprocket, I', at a time. This movement, it will be observed, takes place as soon as the envelope, $d$, is dropped fairly between two links of the chain. By this mechanism, it will be seen the envelopes will be passed from the delivery roll of the machine to the receiving side of the drying chain between which links they rest upon the shelves, $f'$, forming part of the hinge joint of the link. They are thus held securely between the two links of the chain and are held in place at the sides by the guide wires, $h$, and cannot be discharged through the bottom of this side of the chain because of the shelves upon which they rest. One circuit of the chain does not give sufficient time to insure the complete drying of the gum and for that reason, we make the chain of plural capacity and it will now be in order to describe the means whereby, first, the envelope is pushed from the receiving to the delivery side of the chain, and second, the means whereby, when it has completed its circuit on that side of the chain, it is delivered through the bottom. These means are more particularly shown in Figs. 2 to 5. In Fig. 2, it will be seen that the inner guide wires, $h$, are interrupted for a certain distance to allow of the movement of the envelopes from one side of the chain to the other. In the space so interrupted is a pusher rod, T, passing diagonally across the top of the chain so that as the envelopes have nearly completed their circuit or circuits on the receiving side of the machine, their outer edges contact with this pusher rod and are gradually pushed across to the delivery side of the chain. This rod is operated intermittently by mechanism connected with the casting, K, heretofore described. This mechanism consists of a sliding bar, P, mounted in upwardly extending arms, $v$, of a bracket, V, secured to the side guide frame, H, of the chain structure. Upon this bar, P, are two inclined ways, or cams, $p, p'$, the former of which is adapted to engage friction roller, S', carried at the bend of the rod, T. The rod, T, is pivotally supported at $y$, upon the upwardly extending post, Y, on the bracket, V; and the bar, P, is connected to the casting, K, by the pitman, O, fulcrumed thereto at $k''$, and pivotally connected to the bar, P, at $q$. The pusher rod, T, is normally held in position shown in full lines, Fig. 2, by a spring, $t$, connecting the same with the fixed bracket. When the casting, K, is rocked in the manner heretofore described, the inclined cam, $p$, on the sliding bar, P, moves under the roller, S', throwing the rod, T, across the line of travel of the envelopes so as to cause each envelope, $d$, to clear the end of the guide wire, $h$, shown in Fig. 2. From this point in the travel of the chain, the envelopes are carried around the circuit again until they come to the point where they are to be delivered through the bottom of the chain. To accomplish this operation is the purpose of the mechanism next to be described which consists of a tappet arm, or lever, R, preferably of the form clearly shown in Fig. 4, where it is shown as a bell crank lever fulcrumed upon the bracket, V, by any suitable means such as a pin, $u$, passing through the lower end of the tappet and lugs upon the bracket. The outer end of this tappet is provided preferably with a downward projecting portion, $r'$, from the outer end of which portion extends a boss, or stud, $r$. This tappet lever is shown out of action, being held in such position normally by a spring, $s$, connected to the frame of the machine, and when it is operated to deliver the blow upon the envelope, the boss, or stud, $r$, strikes the envelope on one end while the other end of the envelope is struck by the bent portion, $r'$, forming the heel of the tappet. In order to cause this tappet to operate at the proper time, a friction roller, S, is mounted upon a stud projecting from the arm, $r''$, of said tappet lever, which roller is adapted to be engaged and moved by the cam, $p'$, upon the sliding bar, P. From this description, it will be seen that as the sliding bar, P, is moved in one direction through its connections with the casting, K, the pusher rod, T, is operated to push the envelope beyond the edge of the guide wire, $h$, fairly into the delivery side of the chain, which operation takes place during each pause in the travel of the chain, while the movement of the said sliding bar in the other direction operates the tappet, R, to knock the envelopes successively through the bottom of the chain. The envelopes may, of course, be received by suitable delivery mechanism operating underneath the drying chain, or they may be dropped upon the table and removed, in bunches, $b$, by hand, if desired.

Referring now particularly to the details of the chain, Figs. 6 and 8, it will be seen that each link, Z, is composed of two parts, $z, z'$, preferably of a shape substantially as shown. Each of said portions of the links is provided with vertical webs, $w, w'$, which are located so as to prevent the unsealed flaps of the envelope from accidentally passing between the webs of the link, the web, $w$, being located to one side of the center of the portion, $z$, so as to align as nearly as possible with the vertical center of the flaps of the envelope when in place on the delivery side of the chain. Upon the upper part of each of the portions, $z$, constituting the delivery side of the chain, are formed projecting flanges, or lugs, $c$, which are adapted to abut against the back of each preceding link so as to hold the body of the envelope, while in the delivery side of the chain, away from the unsealed flap, as shown in Fig. 10, the envelopes being supported and held up by the guide wires, $c' c'$, which extend throughout the length of the delivery side of the chain, except only at the point where the envelopes are discharged through the bottom of the chain. A projection, $e$, is formed upon the upper extreme point of the portion, $z'$, of each link acting similarly to the flange, $c$. The two links are joined together by a pintle, or rod, $a$, passing through Z-shaped lugs, $g, f$, formed on the bottom of each link. The lugs on either of the faces, in the present instance, on the forward side, of the links are connected by a flange, $f'$, which constitutes a shelf upon which the envelope rests. The projecting ends of the pintle, $a$, slide as heretofore stated upon ways, $h''$, on the two guide frames, H, as shown clearly in Fig. 4. With the joint formed as thus described, it will be seen that the opening between the links cannot be greater than substantially a right angle, the preceding link falling by its own weight as it passes around the sprocket, I', in the position shown in Fig. 3, at which time the envelope is dropped from the machine between two links.

Instead of using the form of link first described, we may use that shown in Fig. 9, where the link is shown the full depth of the envelope, in which case the pusher rod operates in the opening or slot, $c''$, between the upper and lower part of the link; and in such case the link is also recessed to form a shoulder for the guide wire, $h$, as well as to allow the tappet lever to strike the envelope. This construction of link may be otherwise varied to suit circumstances without materially departing from our invention.

The advantages derived from the use of a machine constructed and operating in accordance with the foregoing description are very marked and among them may be mentioned the following: First, by using a chain capable of carrying two or more rows of envelopes side by side, we provide a simple and efficient means of drying envelopes without use of any additional heating devices and we secure great compactness while the operating parts are exceedingly simple in their nature; second, by delivering the envelopes positively through the bottom of the chain instead of through the end, or side, as is the custom, they are less liable to be twisted, or distorted in the preparation of the bunches, and uniformity of delivery of the envelopes and bunches is secured; and, third, the separate parts are few and simple and so located that ready access may be had to them when necessary while the whole structure combines in itself simplicity and effectiveness of operation and durability of construction.

We believe that we are the first to provide a chain with a plural capacity, as herein disclosed, and that we are also the first to strike the envelope through the bottom of the chain instead of passing it through the end, or side thereof, and therefore while we have shown a specific mechanism, which at the present time, we consider as the preferable form for effecting these two essential purposes, we wish it understood that many variations may be made in the several mechanisms for accomplishing these fundamental operations without departing from our invention. For example, it is obvious that while we have shown the mechanism for intermittently rotating the shaft, J, connected with the driving shaft of the machine, such connections may be made with any convenient rotative part of the machine, and the particular mechanism for giving motion to the intermittently rotating shaft may be greatly varied; and the shifting mechanism and the construction of the chain may also be varied without materially departing from our invention.

What we claim as our invention is—

1. A drying chain for envelope machines composed of a series of links, adapted to carry two or more rows of envelopes side by side, and connected together at one end so as to form a closed bottom for supporting the lower edges of the envelopes in that side of the chain, and free at the opposite end so as to provide an unobstructed passage to the bottom delivery of the envelopes carried by that side of the chain, substantially as described.

2. The combination with an envelope machine, of a drying chain composed of a series of connected links, each of which is adapted to hold two or more envelopes side by side thereon, and means for pushing the envelopes from one side of the chain to the other, substantially as and for the purpose specified.

3. A drying chain for envelope machines composed of a series of connected links of plural capacity, one side of each link being provided with means for supporting the bottom edge of the envelope, and the other side provided with a flange adapted to press the envelope against the back of preceding link and hold the body of the envelope out of contact with the unsealed flap, substantially as described.

4. The combination with the delivery of an envelope machine, of a drying chain composed of links adapted to hold two or more envelopes side by side, means for causing chain to travel around its circuit, mechanism for pushing the envelopes from one side of the chain to the other at a certain point in the travel or circuit of said chain, and mechanism for striking and knocking the envelopes successively through the bottom of said chain at a given point in its travel, substantially as described.

5. The combination with an envelope machine, of a drying chain having a receiving and delivery side, a shaft journaled below the delivery rolls of the envelope machine, or other delivery mechanism, a sprocket wheel on said shaft meshing with the links of the drying chain, connections between said shaft and the driving shaft of the machine for intermittently rotating the said shaft, and mechanism for shifting the envelopes successively from the receiving to the delivery side of the chain, substantially as described.

6. The combination with an envelope machine, of a drying chain adapted to hold two or more rows of envelopes side by side, mechanism for giving an intermittent motion to the drying chain, mechanism for pushing the envelopes successively from one side of the chain to the other, whereby the envelope may be caused to make nearly two or more circuits with the chain, substantially as described.

7. The combination with an envelope machine, and the guide frames thereof, of a drying chain adapted to hold two or more rows of envelopes side by side, mechanism for giving intermittent motion to the drying chain, a bar slidably mounted upon the guide frames, mechanism for intermittently moving the said bar, a pusher rod extending diagonally across the line of travel of the envelopes, and connections between the bar and pusher rod for intermittently operating said rod, substantially as and for the purpose specified.

8. The combination with the envelope machine, of the guide frames, the drying chain confined between the same, the intermittently rotated shaft journaled below the delivery of the machine and provided with a sprocket or spur gear, a casting loosely mounted upon said shaft, a ratchet wheel fixed to said shaft, having a pawl thereon engaging the ratchet wheel, a bar slidably mounted upon the guide frames and provided with a cam, a pusher rod fulcrumed upon a fixed part of the device, and extending diagonally across the receiving side of the chain, adapted to be engaged by the cam upon the sliding bar, substantially as and for the purpose set forth.

9. The combination with the envelope machine, of the guide frame secured thereto, a drying chain adapted to hold two or more rows of envelopes confined between said frames, an intermittently rotated shaft journaled below the delivery of said envelope machine, a casting having a pawl thereon loosely mounted upon said shaft, a ratchet wheel fixed to the shaft, a sliding bar actuated from the casting and provided with a cam way mounted upon one of the guide frames, a tappet lever operated by the cam, and extending across the line of travel of the chain, with means for intermittently rotating the shaft, whereby the tappet is caused to strike the envelopes successively through the bottom of the chain, as they pass under the same, substantially as and for the purpose set forth.

10. The combination with the intermittently moving drying chain, of the tappet lever fulcrumed upon the chain structure and extending across and above the line of travel of the envelopes, and normally out of contact therewith, mechanism for giving motion to said chain, and means for causing the tappet to strike the top edge of the envelopes successively as they pass thereunder to knock them through the bottom of the chain, substantially as and for the purpose set forth.

11. The combination with an envelope machine or analogous structure, of a drying chain, a shaft journaled below the delivery of the machine around which shaft the chain passes, connections between the machine and shaft for intermittently rotating the same, mechanism operated from said shaft to shift the envelopes successively from one side of the chain to the other, and mechanism operatively connected with said shaft for striking the envelopes successively through the bottom of the chain, substantially as described.

12. The combination with the drying chain, the driving shaft therefor, mechanism for intermittently rotating the shaft, a bar provided with two oppositely acting cams slidably mounted upon a fixed part of the drying chain structure, a pusher rod adapted to be engaged by one of the cams and pivoted to the chain structure and extending diagonally across the top thereof, a bell crank tappet lever adapted to be engaged by the other cam and pivoted to the chain structure and having one arm extending transversely above the chain and normally held out of contact with the envelopes in the said chain, with connections between said sliding bar and shaft, whereby movement of the sliding bar in one direction as the chain pauses moves the pusher rod to throw the envelopes beyond the central line of the chain and movement of the said bar in the opposite direction operates the tappet lever to strike an envelope through the bottom of the chain, substantially as described.

13. The combination with the drying chain, of plural capacity, of the guide frames for supporting and confining the links of the chain, guide wires at each side of the links, guide wires between the receiving and delivery sides of the chain, and the bottom guide wires on the delivery side of the chain, substantially as described.

14. The combination with the chain adapted to carry two or more rows of envelopes side by side and composed of a series of links hinged together at one side by pintles or rods, of the guide frames for supporting and confining the chain having slide-ways upon which the end of the pintles are adapted to travel, and guide wires at each side of the links and between the adjacent rows of envelopes for confining the envelopes in their travel with the chain, substantially as described.

15. A drying chain for envelope machines composed of a series of links, each adapted to hold two or more envelopes side by side, said links being provided at one side with lugs projecting in opposite directions therefrom, with flanges connecting the lugs on one of the sides of the links forming shelves upon which the envelopes may rest, pintles passing through the lugs to hinge the links together at that side, and flanges projecting forwardly from the top of the other side of the link, the bottom of said side being open and free from obstruction, substantially as described.

16. The combination with an envelope machine, and the guide frames, H, H', and the guide wires, h, secured thereto, of the drying chain adapted to hold two or more rows of envelopes side by side confined between the same, the shaft journaled below the table of the machine the pusher rod fulcrumed upon the guide frame, H, the tappet lever likewise fulcrumed upon said guide frame, the guide frames, H', and inner guide wires, h, being interrupted between the said shaft and the tappet lever to permit the envelopes to be discharged through the bottom of the chain and to allow the envelopes to be shifted from one side of the chain to the other, connections between the machine and the shaft for intermittently rotating said shaft, with pusher and tappet mechanism, to push the envelopes successively from one side of the chain to the other and strike the same through the bottom thereof, substantially as described.

In testimony whereof we have signed our names to this specification in the presence of two subscribing witnesses.

HENRY BUCKLEY COOLEY.
JOHN MADISON NOBLE.
JAMES EDWARD TREVOR.

Witnesses:
S. WESLEY GROVER,
JOHN DARBY.